United States Patent [19]

Grover et al.

[11] 4,369,894
[45] Jan. 25, 1983

[54] FILAMENT WOUND VESSELS

[75] Inventors: Richard L. Grover; William D. Humphrey, both of Lincoln, Nebr.

[73] Assignee: Brunswick Corporation, Skokie, Ill.

[21] Appl. No.: 220,972

[22] Filed: Dec. 29, 1980

[51] Int. Cl.³ .................... B65D 25/34; B65D 90/02; B65D 90/06
[52] U.S. Cl. ................................. 220/414; 220/3; 220/71; 220/83
[58] Field of Search ................ 220/3, 414, 83, 71; 156/170, 172

[56] References Cited

U.S. PATENT DOCUMENTS

| | | |
|---|---|---|
| 2,744,043 | 5/1956 | Ramberg . |
| 2,964,442 | 12/1960 | Hansen . |
| 3,047,191 | 7/1962 | Young ................... 220/83 |
| 3,112,234 | 11/1963 | Krupp ................... 220/3 X |
| 3,207,352 | 9/1965 | Reinhart, Jr. ............ 220/3 |
| 3,239,092 | 3/1966 | Levenetz ................ 220/3 |
| 3,293,860 | 12/1966 | Stedfeld ............... 220/3 X |
| 3,788,162 | 1/1974 | Rabenhorst et al. . |
| 3,847,716 | 11/1974 | Dorsch ................. 220/414 |
| 4,053,081 | 10/1977 | Minke .................. 220/73 X |

Primary Examiner—Allan N. Shoap
Attorney, Agent, or Firm—Hosier, Niro & Daleiden

[57] ABSTRACT

A filament wound pressure vessel is disclosed and has a spherical shape including a polar opening with a fitting disposed in the opening and protruding therefrom. A plurality of layers of filaments are wound about the polar fitting. Each layer comprises a sequence of polar winding patterns wound with incrementally increasing wind angles away from the polar fitting, creating voids at the junctures of adjacent patterns near the polar fitting and thus between sequential layers at said junctures. One or more annular fill doilies are installed in annular regions about the polar fitting to fill the voids between the layers at the junctures of adjacent winding patterns. The doilies are circular in configuration with a central opening for installation concentric with the polar opening. Preferably, a plurality of the doilies of increasing diameters are installed to fill respective voids at the junctures of the winding patterns of increasing wind angles, with the larger of the doilies installed over the smaller doilies between the filament wound layers.

15 Claims, 5 Drawing Figures

FILAMENT WOUND VESSELS

BACKGROUND OF THE INVENTION

This invention relates generally to filament wound vessels and particularly to such vessels which are used in a state of ultra-high pressures.

Filament wound vessels often are constructed in a spherical shape for use in high pressure container applications. In many circumstances, the qualities of light-weight construction and high resistance to fragmentation and corrosion damage are highly desirable with such pressure vessels. Therefore, for some years, these design criteria have been satisfactorily met by the development of high pressure containers fabricated of laminated layers of wound fiberglass filament or various types of synthetic filament, such as nylon and rayon yarn, which are bonded together by a thermo-setting epoxy resin.

The spherical shape of high pressure vessels has other important advantages, including filament winding patterns which produce a quasi-isotropic composite. Such spherical composite pressure vessels currently are used for space shuttle tankage, for instance. In some applications, the vessels are required to contain ultra-high pressures, operating at 25,000 p.s.i. with design burst values in the 50,000 p.s.i. range. Composite pressure vessels are especially appropriate for such high pressure applications, since the manufacture of a thicker vessel wall structure essentially requires winding more layers of filaments. However, pressure vessels with thick walls are characterized by steep strain gradients through the wall, the inner strains being quite high when compared with those at the outer surface. An important parameter in controlling the strain gradient is the transverse or radial stiffness of the composite. Transverse stiffness is influenced by the wind angle of the vessel, as well as any delaminations or other defects induced during fabrication. Of major consideration, and thus a major problem, is the laminate void content of the composite. High quality laminates show a constant high value of transverse stiffness. However, if the laminate has voids or delaminations, such voids initially are crushed or closed, resulting in low initial stiffness.

The problem of laminate void content is particularly prevalent in polar wound vessels, such as spherical vessels or other vessels having a spherically shaped end. Most often, a polar opening is provided with a boss or fitting disposed in the opening and protruding outwardly therefrom. The vessel is wound by a known method in a numerically controlled winding apparatus using a sequence of polar winding patterns wound with incrementally increasing wind angles away from the polar opening or fitting. In practice, normally two layers of the first winding pattern are wound adjacent the polar fitting. Single layers of the remaining winding patterns are wound by increasing the wind angle in an incremental or stepwise fashion. The required thickness is obtained by repeating this sequence of patterns an integral number of times corresponding to the desired number of layers.

With such polar wound vessels, the region near the polar opening or fitting must be adequately designed to prevent premature failure in this area. More particularly, with such polar wound vessels, such as spherical vessels, the surface of the vessel resulting from a complete sequence of winding patterns, is irregular due to the high fiber build-up at the beginning of each pattern. This is most pronounced between the first and second patterns where the fiber path may actually be concave. When the next sequence of patterns is wound, the first pattern of the next sequence or layer of patterns must be wound over this surface and fiber bridging can result in air entrapment causing the aforesaid undesirable voids. There is a higher void area around the polar opening or fitting in the vicinity of the winding patterns of smaller wind angles.

The present invention is directed to solving the void problems mentioned above by providing a filament wound pressure vessel of the character described which includes filament filler means installed to fill the voids or delaminations and thereby prevent premature failure in the area near the polar opening or fitting.

SUMMARY OF THE INVENTION

An object, therefore, of the present invention is to provide a new and improved filament wound pressure vessel designed to eliminate voids between adjacent winding patterns and thus between sequential layers of winding patterns.

Another object of the invention is to provide filler means for eliminating such voids or delaminations in the area of a polar opening or fitting.

In the exemplary embodiment of the invention, a spherical filament wound pressure vessel is disclosed with a polar opening a fitting disposed therein and protruding outwardly therefrom. A plurality of layers of filaments comprise the major thickness of the vessel. Each layer comprises a sequence of polar winding patterns wound with incrementally increasing wind angles away from the polar opening creating voids at the junctures of adjacent patterns predominantly near the polar opening and thus between sequential layers at the pattern junctures. The invention includes at least one annular fill doiley installed in an annular region about the polar opening to fill a respective one of the voids.

In the disclosed embodiment of the invention, a plurality of the fill doilies are provided of increasing diameters to fill respective voids at the junctures of the winding patterns of increasing wind angles about the polar opening. The larger of the fill doilies of increasing diameters are installed over the smaller doilies between the filament wound layers of winding patterns. The doilies are circular in configuration with a central opening for installation concentric with the polar opening.

The winding patterns and the fill doilies are intermixed or impregnated with epoxy resin to further fill the voids. A vessel which is filament wound with Kevlar 49 impregnated with epoxy resin has proven effective. A quasi-isotropic glass cloth doiley has been employed with such vessels.

Preferably, the composite of the vessel is wound on a metal liner, such as an aluminum alloy liner, which is highly ductile in order to be compatible with the high composite strains. The metal liner is used as a pressure barrier rather than a load carrying portion of the vessel.

Such pressure vessels in accordance with the present invention have been tested for operating pressures on the order of 25,000 p.s.i. with design burst values in the 50,000 p.s.i. range. Such vessels have been spherical in shape, with a five inch inside diameter.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 5 is a plan view illustrating the fill doilies of FIG. 4.

DETAILED DESCRIPTION OF THE INVENTION

Figure 1:
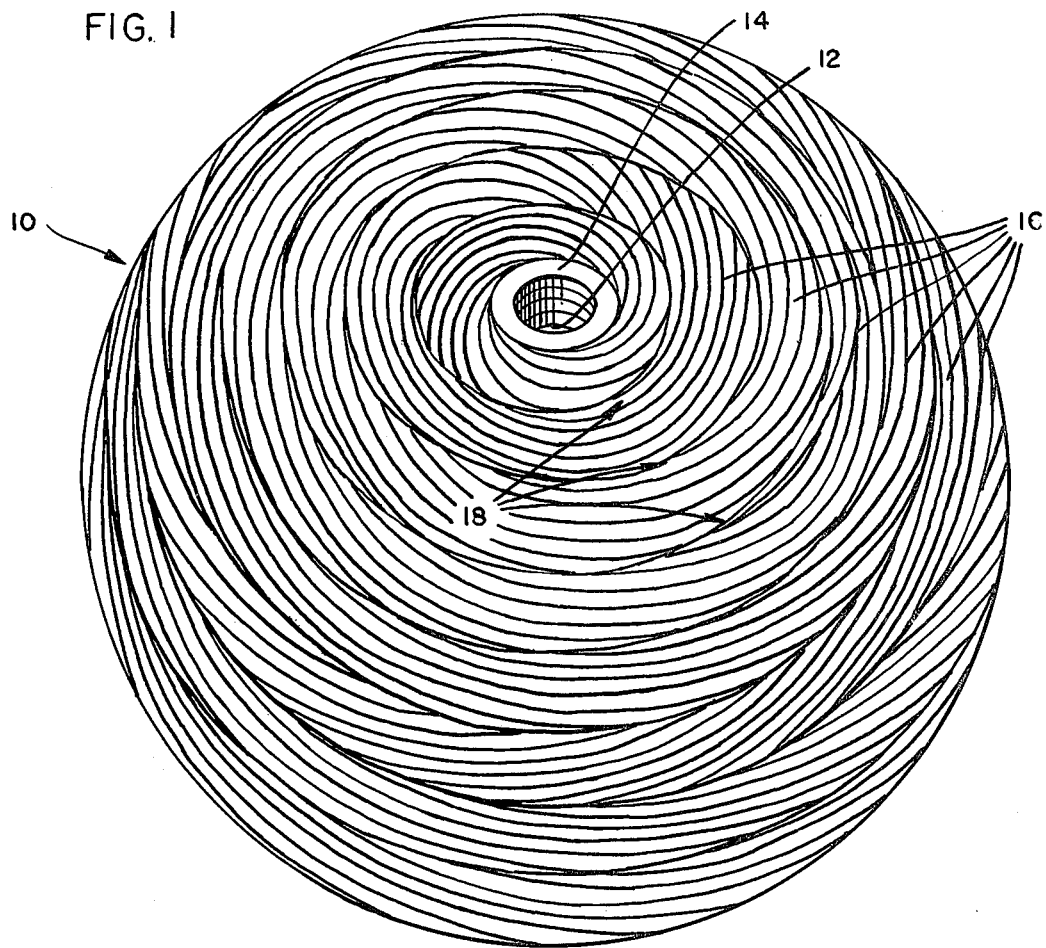
FIG. 1 is a perspective view of a spherical wound pressure vessel illustrating the irregular surface of the vessel resulting from a complete sequence of winding patterns.

Referring to the drawings in greater detail, and first to FIG. 1, a spherical filament wound pressure vessel, generally designated 10, is shown with a polar opening, generally designated 12, having a fitting or boss 14 disposed therein. At least with the initial layers of filaments, polar boss 14 protrudes outwardly of the vessel for winding the layers of filaments thereabout. A plurality of layers of filaments comprise the major thickness of the vessel. Each layer comprises a sequence of polar winding patterns 16 wound with incrementally increasing wind angles away from polar opening 12 or boss 14. The surface of each layer of polar winding patterns 16 normally is irregular due to the high fiber or filament build-up at the beginning of each pattern. Consequently, voids, generally designed 18, are created at the junctures of adjacent winding patterns and thus between sequential layers at said junctures. The voids are most pronounced near the polar opening 12 or boss 14 where the winding patterns have decreasing wind angles. Although FIG. 1 shows a completed filament wound spherical vessel, these voids 18 are created throughout the thickness of the vessel between the layers of winding patterns, as described in greater detail hereinafter. The present invention is directed to designing the filament wound composite so as to eliminate interior voids or delaminations and thereby prevent premature failure particularly in the area surrounding the polar opening or boss where the winding patterns have decreasing wind angles.

Figure 2:
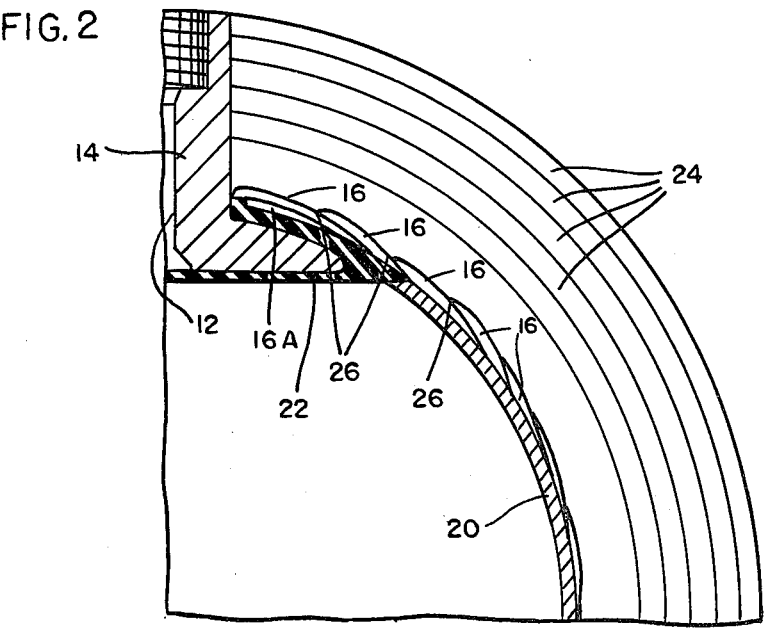
FIG. 2 is a fragmented, somewhat schematic sectional view of a quadrant of a spherical vessel showing the sequence of polar winding patterns of an initial layer of wound filaments.

Referring to FIG. 2, a quadrant section through the spherical wound pressure vessel of FIG. 1 is shown to better illustrate the build-up of polar winding patterns and consequent layers of patterns. More particularly, polar opening 12 is shown fitted with a polar boss 14 and about which layers of the winding patterns are polar wound. A metal liner 20, such as a thin aluminum alloy liner, is provided for receiving the initial winding patterns. This liner can deform plastically under ultra-high pressures and serves as a pressure barrier rather than a load carrying portion of the vessel. A rubber seal 22 is provided between the base of boss 14 and aluminum liner 20.

As shown in FIG. 2, two layers of the first winding patterns are wound adjacent boss 14. More particularly, a first layer 16A is wound about boss 14. A complete single layer of polar winding patterns 16 then are wound, beginning on top of initial pattern 16A, with incrementally increasing wind angles away from polar boss 14. For instance, a sequence of nine polar patterns have been utilized with wind angles ranging from approximately 12° to 90°. The required thickness for the composite vessel is obtained by repeating this sequence of polar winding patterns an integral number of times to wind the desired number of layers to achieve the desired vessel thickness. In FIG. 2, subsequent layers of winding patterns are indicated schematically at 24.

FIG. 2 shows the irregular surface of each layer of filaments resulting from a complete sequence of winding patterns 16. This irregular surface is due to the high fiber or filament build-up at the beginning of each pattern. As can be seen, this is most pronounced between the first and second patterns where the fiber path may actually be concave. When the next sequence or layer of patterns is wound, the patterns must be wound over this irregular surface and fiber bridging can result in air entrapment or voids at junctures 26 adjacent winding patterns 16 and thus between sequential layers 24 at said junctures. As can be seen, the voids at junctures 26 are more pronounced near polar boss 14 as the pattern wind angles decrease near the polar boss.

Figure 3:
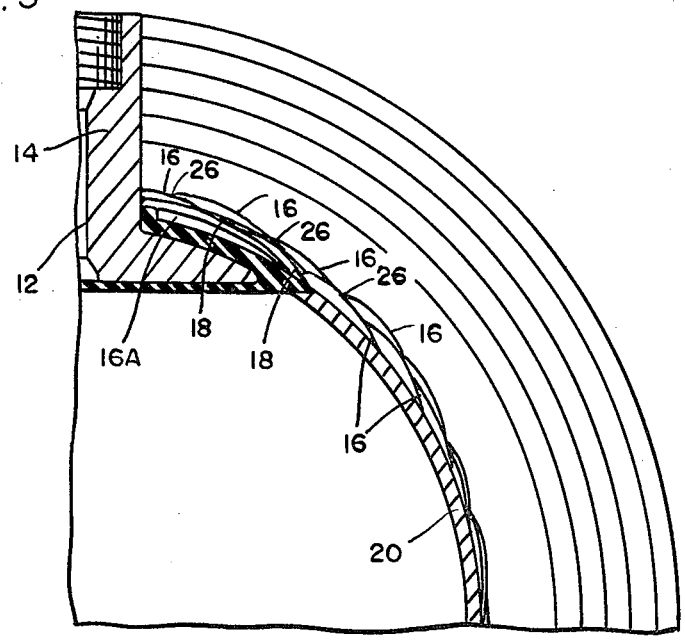
FIG. 3 is a view similar to that of FIG. 2, showing the details of a second layer of polar winding patterns.

Referring to FIG. 3, a second layer of polar winding patterns 16 are shown wound over the first layer described above. Here it can be seen that by winding the second layer of patterns over the irregular surface of the first layer, fiber bridging results in air entrapment causing the aforesaid undesirable voids 18. These voids will continue through the entire thickness of the vessel, and, unless filled, result in dilaminations and premature failure particularly near the polar area of the vessel around polar boss 14.

Figure 4:
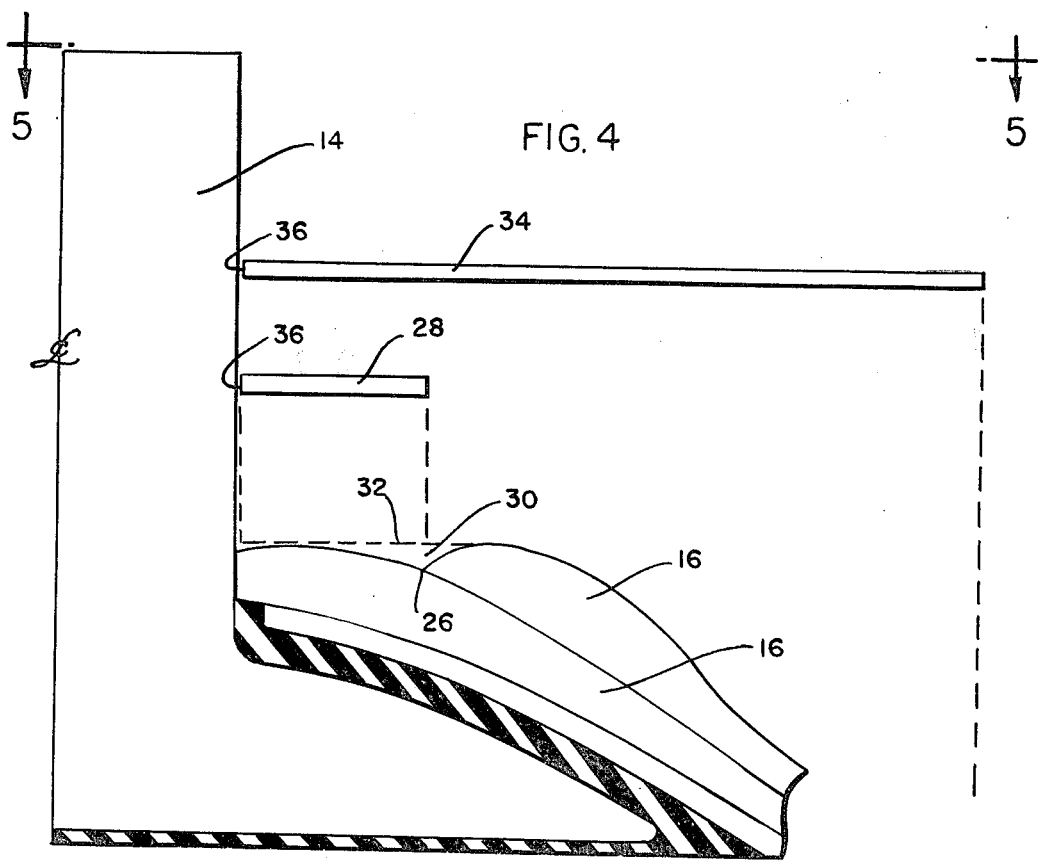
FIG. 4 is a fragmented sectional view, on an enlarged scale, of the initial winding patterns of FIG. 2, and illustrating a pair of fill doilies in accordance with the present invention.

Referring to FIG. 4, the present invention contemplates the utilization of filament filler means installed about polar boss 14 to fill the voids described above to enhance the integrity, including transverse stiffness, of the composite in the region near polar boss 14 and thereby prevent premature failure of the vessel in this area. More particularly, at least one annular fill doiley 28 is installed in an annular region 30 (i.e. void 18) about polar boss 14 to fill the void created in this region at juncture 26 between adjacent winding patterns 16. At this point, it should be noted that pressure vessels as contemplated herein normally are fabricated of a filament material which is intermixed or impregnated with an epoxy resin. Although doiley 28 is quite effective in filling annular region 30 between adjacent winding patterns 16, the epoxy resin further enhances the filling capabilities of the doiley by smoothing the outer surface of the layered winding patterns. Consequentially, a smooth filled surface as indicated at 32 results by installing doiley 28 in combination with the epoxy resin and thereby eliminates any voids in the annular region at juncture 26 between adjacent winding patterns 16. The next layer 24 (FIG. 2) of winding patterns 16 then is wound over the installed doiley and there is no fiber bridging, or voids, left in the surface of the previous layer of winding patterns. This is particularly important with a doiley sized as that shown at 28 in order to fill the more pronounced void near polar boss 14 resulting from the wind patterns of relatively small wind angles.

The invention also contemplates the utilization of a plurality of doilies of increasing diameters to fill respective voids at the junctures of winding patterns 16 of increasing wind angles. Again referring to FIG. 4, a second doiley 34 is shown of a larger dimension than doiley 28. This doiley 34 would be placed over doiley 28 and winding patterns 16 to the radial dimension or extent of doiley 34. This larger doiley is effective to fill voids created by winding patterns 16, at the junctures thereof, for winding patterns of increasing wind angles away from polar boss 14. Of course, as seen in FIG. 2, as the wind angle of winding patterns 16 increases away from polar boss 14, voids at the junctures between the winding patterns substantially decrease and are practically eliminated as the winding patterns approach a wind angle near the "equator" of the spherical vessel. Consequently, the radial dimensions of doiley 34 would be determined by various parameters involved, including the diameter of the spherical vessel itself, as well as the content of winding patterns 16, which are determinative of the void content in the surface of the laminate. Consequently, more than two doilies 28, 34 are contemplated.

Doilies 28, 34 preferably are circular in configuration for use with the spherical pressure vessel disclosed herein. Each doiley has a central opening 36 for installation of the doilies over polar boss 14 concentric with the polar opening. The doilies are fabricated of glass cloth or other appropriate woven or filament material so as to provide quasi-isotropic structures. The thickness of the doilies shown in FIG. 4 may be somewhat exaggerated to facilitate the illustration.

FIG. 5 is a plan view and shows the configuration and placement of the doilies. It should be understood that the doilies are installed as needed between each layer 24 (FIG. 2) of filament winding patterns 16 so as to eliminate voids between the layers and thereby prevent delaminations as is prevalent in the prior art with filament wound pressure vessels of the character described.

It will be understood that the invention may be embodied in other specific forms without departing from the spirit or central characteristics thereof. The present examples and embodiments, therefor, are to be considered in all respects as illustrative and not restrictive, and the invention is not to be limited to the details given herein.

What is claimed is:

1. In a filament wound pressure vessel which has a spherical portion including a polar opening, a plurality of layers of filaments comprising part of the thickness of the vessel and wound about said polar opening, and each layer comprising a sequence of polar winding patterns wound with incrementally increasing wind angles away from said polar opening creating voids at the junctures of adjacent winding patterns near the polar opening and thus between sequential layers at said junctures; a plurality of annular fill doilies installed in an annular region about said polar opening, each doiley to fill a respective one of said voids, the doilies being sized relative to the respective voids such that the outer circumference of each doiley is located generally at the juncture of adjacent winding patterns at the respective void.

2. In a filament wound pressure vessel as set forth in claim 1, wherein said plurality of fill doilies are of increasing diameters to fill respective voids at the junctures of said winding patterns of increasing wind angles.

3. In a filament wound pressure vessel as set forth in claim 1, wherein each of said fill doilies is circular in configuration with a central opening for installation concentric with said polar opening.

4. A filament wound vessel which includes a spherical portion having a polar opening, a plurality of layers of filaments comprising part of the thickness of the vessel and wound about said polar opening, each layer comprising a sequence of polar winding patterns wound with incrementally increasing wind angles away from said polar opening creating voids at the junctures of adjacent winding patterns near the polar opening and thus between sequential layers at said junctures, and a plurality of filament filler means installed about said polar opening, each filler means to fill a respective one of said voids, the filament filler means being sized relative to the respective voids such that the outer circumference of each filler means is located generally at the juncture of adjacent winding patterns at the respective void.

5. The filament wound vessel of claim 4, wherein each of said filler means comprises at least one filament member installed in a region about said polar winding to fill a respective one of said voids.

6. The filament wound vessel of claim 5, wherein said plurality of said filament members are of increasing dimensions to fill respective voids at the junctures of said winding patterns of increasing wind angles.

7. The filament wound vessel of claim 5, wherein said filament windings and said filament members are intermixed with epoxy resin to further fill said voids.

8. A spherical filament wound pressure vessel having a polar opening with a fitting disposed in said opening and protruding outwardly of said vessel, a plurality of layers of filaments comprising a major thickness of the vessel and wound about said fitting, and each layer comprising a sequence of polar winding patters wound with incrementally increasing wind angles away from said fitting creating voids at the junctures of adjacent winding patters near the fitting and thus between sequential layers at said junctures; a plurality of annular fill doilies installed in an annular region about said fitting, each doiley to fill a respective one of said voids, the doilies being sized relative to the respective voids such that the outer circumference of each doiley is located generally at the juncture of adjacent winding patterns at the respective void.

9. A spherical filament wound pressure vessel as in claim 8, wherein said plurality of fill doilies are of increasing diameters to fill respective voids at the junctures of said winding patterns of increasing wind angles.

10. A spherical filament wound pressure vessel as in claim 8, wherein each of said fill doilies is circular in configuration with a central opening for installation concentric with said polar opening.

11. A spherical filament wound pressure vessel as in claim 8, wherein said winding patterns and said fill doilies are intermixed with epoxy resin to further fill said void.

12. A spherical filament wound pressure vessel as in claim 8, wherein said winding patterns are wound on a thin metal liner.

13. In a filament wound pressure vessel which has a spherical portion including a polar opening, a plurality of layers of filaments comprising part of the thickness of the vessel and wound about said polar opening, and each layer comprising a sequence of polar winding patterns wound with incrementally increasing wind angles away from said polar opening creating voids at the junctures of adjacent winding patterns near the polar opening and thus between sequential layers at said junctures; a plurality of annular fill doilies of increasing diameters installed in an annular region about said polar opening to fill respective voids at the junctures of said winding patterns of increasing wind angles, the larger of said plurality of fill doilies being installed over the smaller of said doilies between said layers.

14. A filament wound vessel which includes a spherical portion having a polar opening, a plurality of layers of filaments comprising part of the thickness of the vessel and wound about said polar opening, each layer comprising a sequence of polar winding patterns wound with incrementally increasing wind angles away from said polar opening creating voids at the junctures of adjacent winding patterns near the polar opening and thus between sequential layers at said junctures, and a plurality of filament members of increasing dimensions installed about said polar opening to fill respective voids at the junctures of said winding patterns of increasing wind angles, the larger of said plurality of filament members being installed over the smaller of said filament members between said layers.

15. A spherical filament wound pressure vessel having a polar opening with a fitting disposed in said opening and protruding outwardly of said vessel, a plurality of layers of filaments comprising a major thickness of the vessel and wound about said fitting, and each layer comprising a sequence of polar winding patterns wound with incrementally increasing wind angles away from said fitting creating voids at the junctures of adjacent winding patterns near the fitting and thus between sequential layers at said junctures; a plurality of annular fill doilies of increasing diameters installed in an annular region about said fitting to fill respective voids at the junctures of said winding patterns of increasing wind angles, the larger of said plurality of fill doilies being installed over the smaller of said doilies between said layers.

* * * * *